UNITED STATES PATENT OFFICE.

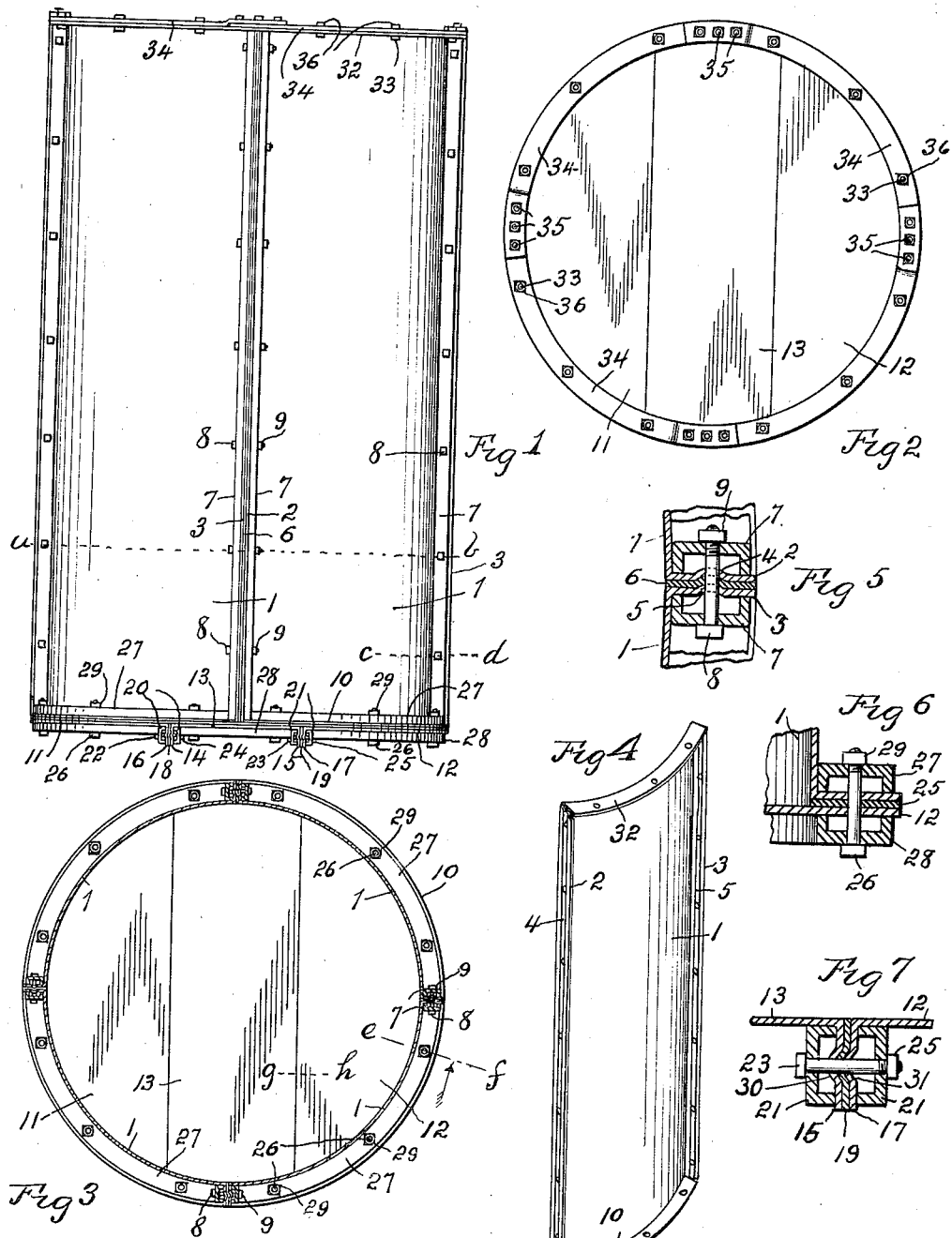

PETER C. ICKES, OF CHANUTE, KANSAS.

KNOCKDOWN TANK.

1,019,255.    Specification of Letters Patent.    Patented Mar. 5, 1912.

Application filed September 25, 1911. Serial No. 651,120.

*To all whom it may concern:*

Be it known that I, PETER C. ICKES, a citizen of the United States, residing at Chanute, in the county of Neosho and State of Kansas, have invented certain new and useful Improvements in Knockdown Tanks, of which the following is a specification.

My invention relates to improvements in knock down tanks.

The object of my invention is to provide a tank which may be sent in compact knock down form to the place where it is to be used, and there assembled readily in operative condition by an unskilled person.

My invention is particularly adapted to be used for storing crude oil at the place of production. Ordinarily tanks for this purpose, owing to their large size, are built at the oil fields or are shipped at considerable expense and great inconvenience to such fields from another place of manufacture. By reason of the knock down character of my improved tanks they may be readily shipped from place to place or stored in compact form.

In the preferred form of my invention, the tanks are composed of sheet metal, thereby eliminating loss by evaporation through the walls of the tank, and also eliminating the requirement of a covering, such as is usually provided for protecting the ordinary wooden tanks from deterioration due to the action of the elements.

In the accompanying drawings which illustrate one form of my invention, Figure 1 is a side elevation of my improved tank. Fig. 2 is a top view of the same. Fig. 3 is a horizontal section on the line *a—b* of Fig. 1. Fig. 4 is a perspective view of one of the side members. Fig. 5 is an enlarged cross section on the dotted line *c—d* of Fig. 1. Fig. 6 is an enlarged vertical section on the line *e—f* of Fig. 3. Fig. 7 is an enlarged cross section on the line *g—h* of Fig. 3.

Similar reference characters designate similar parts throughout the different views.

In the preferred form of my invention the tank is composed of sheet metal, the sides comprising a plurality of longitudinal side members 1, one of which is shown detached in Fig. 4. The side edges of each member 1 are provided respectively with longitudinal radial flanges, preferably extending outwardly, and denoted by 2 and 3. The flange 2 of each member 1 is provided with a longitudinal corrugation 4 which registers with a mating corrugation 5, as best shown in Fig. 5. Packing material 6 is interposed between the flanges 2 and 3 of adjacent side members 1. Each set of flanges 2 and 3 is located between two longitudinal channel members 7, the flanges of one channel member bearing against the adjacent flange 2 and the flanges of the other channel member bearing against the flange 3, the corrugations 4 and 5 being located between the flanges of the channel members 7. Bolts 8 extend horizontally through the flanges 2 and 3 and through the adjacent channel members 7, between the flanges of the channel members, as shown in Fig. 5. Nuts 9 mounted on the bolts 8 serve to hold the channel members 7 clamped tightly against the flanges 2 and 3, and to clamp tightly the packing material 6, which may be of asbestos, rubber, lead or other suitable material, between the flanges 2 and 3.

The lower ends of the members 1 are preferably provided with horizontal flanges 10, which preferably extend outwardly.

The bottom of the tank is composed preferably of a plurality of members disposed edge to edge. In the drawings I have shown the bottom as being composed of two side members 11 and 12 and an intermediate member 13. The intermediate member 13 at opposite edges is provided with longitudinal flanges 14 and 15 disposed respectively parallel with flanges 16 and 17 provided on the edges adjacent thereto of the members 11 and 12.

Between the flanges 14 and 16 is interposed packing material 18. Between the flanges 15 and 17 is interposed packing material 19. The flanges 14 and 16 are disposed between two horizontal longitudinal channel bars 20 the flanges of which bear respectively against the flanges 14 and 16. The flanges 15 and 17 are similarly disposed between channel members 21.

Bolts 22 extend through the channel members 20 and the flanges 14 and 16. In like manner bolts 23 extend through the channel members 21 and the flanges 15 and 17. Nuts 24 are provided on the bolts 22 which coöperate with the bolts 22 to hold the channel members 20 clamped to the flanges 14 and 16. Nuts 25 are provided on the bolts 23 for holding the channel members 21 clamped to the flanges 15 and 17.

Upon the bottom members 11, 12 and 13 is mounted packing material 26 upon which rest the lower horizontal flanges 10. Vertical bolts 26 extend through the bottom members 11, 12 and 13, the flanges 10, and through curved channel members 27 and 28 disposed respectively upon the flanges 10 and against the undersides of the bottom members 11, 12 and 13, as is best illustrated in Fig. 6. The bolts 26 are provided with nuts 29 bearing against the upper sides of the channel members 27, whereby the channel members 27 and 28 have their flanges bearing tightly against the flanges 10 and the bottom plates 11, 12 and 13.

Preferably the flanges 14 and 15 are provided with longitudinal corrugations 30 which mate with similar corrugations 31 provided in the flanges 16 and 17, as is best illustrated in Fig. 7. These corrugations are disposed between the flanges of the channel bars or members which clamp the flanges together. The corrugations 30 and 31 serve to more tightly seal the joints between the clamping channel members.

The upper ends of the side members 1 are provided with horizontal flanges 32, which preferably extend outwardly and are secured by vertical bolts 33 to a ring comprising preferably a plurality of sections 34 which overlap each other and are secured together by bolts 35. The bolts 33 are provided with nuts 36 bearing upon the upper sides of the sections 34.

The various parts of the tank may be shipped knock down to the place where the tank is to be used, after which the parts may be readily assembled in the positions intended for them by unskilled labor. Any desired number of side members 1 and bottom members may be employed.

I do not limit my invention to the structure shown and described as modifications of my invention, within the scope of the appended claims, may be made without departing from the spirit of my invention.

Having thus described my invention, what I claim and desire to secure by Letters Patent, is:—

1. In a knock down tank, two members disposed edge to edge, adjacent edges of said members having longitudinal flanges, packing material interposed between adjacent flanges of the members, two channel clamping members having their flanges extending toward each other and bearing respectively against the said longitudinal flanges, the longitudinal flanges being located between said channel members, and securing means for holding said channel members clamped respectively against said longitudinal flanges.

2. In a knock down tank, two members disposed edge to edge, adjacent edges having longitudinal flanges each having a mating corrugation registering with the corrugation of the other member, packing material interposed between said flanges, two channel members between which the flanges are located, the flanges of one channel member extending toward the flanges of the other channel member, and securing means for holding the flanges of the channel members clamped against the said longitudinal flanges respectively.

3. In a knock down tank, two members disposed edge to edge, adjacent edges having longitudinal flanges, packing material interposed between said flanges, two channel clamping members between which the flanges are located and against which the flanges of the channel members bear respectively, and a securing device extending through said longitudinal flanges and connected to said channel members for holding the channel members clamped against the longitudinal flanges.

4. In a knock down tank, two members disposed edge to edge, adjacent edges having longitudinal flanges, the flanges having mating corrugations registering with each other, packing material interposed between said flanges, two channel clamping members between which the flanges are located and against which the flanges of the channel members bear respectively, the said corrugations being disposed between the flanges of the channel members, and a securing device extending through said longitudinal flanges and connected to the channel members for holding the channel members clamped against said longitudinal flanges.

5. In a knock down tank, two members having portions disposed parallel with each other, packing material interposed between said parallel portions, two channel clamping members having their flanges bearing respectively against said parallel portions, and means for holding the channel members clamped respectively against said parallel portions.

6. In a knock down tank, two members having portions disposed parallel with each other, two channel clamping members between which said parallel portions are disposed and which have their flanges bearing respectively against said parallel portions, and means for holding the channel members clamped respectively against said parallel portions.

7. In a knock down tank, two members having portions disposed parallel with each other, said parallel portions having mating corrugations which register with each other, two channel clamping members between which said parallel portions are disposed and which have their flanges bearing respectively against said parallel portions, and means for holding the channel members clamped respectively against said parallel portions.

8. In a knock down tank, two members one having a flange disposed parallel with the other member, two channel clamping members having their flanges bearing respectively against said flange and against the member opposite thereto, and means for holding the channel members clamped against said flange and opposite member.

9. In a knock down tank, a side member and a bottom member having portions parallel with each other, two channel clamping members having their flanges bearing respectively against said parallel portions, and means for holding the channel members clamped against said parallel portions.

10. In a knock down tank, a side member and a bottom member the side member having a flange parallel with the bottom member, two channel clamping members having their flanges bearing respectively against the bottom member and the flange, and means for holding the channel members clamped against the flange and bottom member respectively.

11. In a knock down tank, two members having flanges respectively, channel clamping members having their flanges bearing respectively against said flanges, and means connecting the channel members for holding them clamped against said flanges of the first named members.

12. In a knock down tank, two members having respectively two flanges which are parallel with each other, packing material between the flanges, two channel clamping members having their flanges bearing respectively against the first named flanges, and means for holding the channel members clamped respectively against said first named flanges.

In testimony whereof I have signed my name to this specification in presence of two subscribing witnesses.

PETER C. ICKES.

Witnesses:
E. B. House,
Florence M. Vendig.